United States Patent [19]

Harsányi et al.

[11] 3,901,803

[45] Aug. 26, 1975

[54] PROCESS FOR THE REMOVAL OF SUSPENDED GRAINS FROM SODIUM ALUMINATE LIQUOR

[75] Inventors: József Harsányi; Péter Nagy, both of Budapest, Hungary

[73] Assignee: Aluterv Aluminiumipari Tervezo Vallalat, Budapest, Hungary

[22] Filed: May 1, 1973

[21] Appl. No.: 356,176

[30] Foreign Application Priority Data
May 5, 1972 Hungary............................. AU 273

[52] U.S. Cl.................................. 210/44; 423/121
[51] Int. Cl.²........................................... C01F 7/46
[58] Field of Search............................. 210/44, 221; 423/119–121, 123

[56] References Cited
UNITED STATES PATENTS

| | | | |
|---|---|---|---|
| 2,321,186 | 6/1943 | Christmann et al. | 210/44 X |
| 2,765,919 | 10/1956 | Juell | 210/221 |
| 2,793,185 | 5/1957 | Albrektsson et al. | 210/44 |
| 3,434,968 | 3/1969 | Lowe | 210/44 |
| 3,705,650 | 12/1972 | Gotte | 210/221 |
| 3,728,432 | 4/1973 | Petitjean et al. | 423/121 |

*Primary Examiner*—Thomas G. Wyse
*Attorney, Agent, or Firm*—Young & Thompson

[57] ABSTRACT

The process according to the invention relates to the continuous or intermittent removal of suspended particles from sodium aluminate liquor in such a manner that the sodium aluminate liquor is flown under an overpressure of 1–5 at. while gas or preferably air is dissolved in it following which, through a pressure releasing device, it is conducted into a closed tank, the upper part of which is kept at a vacuum of at least 50 Torr; the foamy phase separating there and entraining the suspended grains is drained through a vacuum pipe and sodium aluminate liquor having thus been cleaned from the suspended grains is drained away in the proximity of the liquid level height.

The invention can be applied for the removal of suspended impurities in the sodium aluminate liquor denominated in the alumina plant practice as alumina-, spent- and thick-liquor; this process had been previously practiced by means of filtering, settling or centrifuging.

1 Claim, No Drawings

PROCESS FOR THE REMOVAL OF SUSPENDED GRAINS FROM SODIUM ALUMINATE LIQUOR

The present invention relates to the removal of suspended particles from sodium aluminate liquor.

In alumina production according to the Bayer process red mud is separated from sodium aluminate liquor by means of settling and/or filtration following digestion of $Al_2O_3$. Following any of these processes some 30–50 mg/l red mud remains in the sodium aluminate liquor in the form of a suspension. Since these suspension tend to contaminate the further product, different procedures have been applied for their removal. Such known procedures are the control settling and control filtration. In this latter case aluminahydrate, coke-limestone mixture, corundum, bauxite, paper slurry, sawdust, etc., is applied as a filter bed and regenerated or exchanged intermittently or continuously.

However, no one of these processes could fully solve the problem. Control filtration takes a rather long time and requires a considerable tank volume, in addition before the process is terminated hydrolysis sets in which at this stage is still detrimental. In case of the known filter bed solutions hydrolysis also takes place and in addition they are rather labour intensive.

The aim of the invention is to provide such a process by means of which suspensions can continuously be eliminated from sodium aluminate liquor, resp. their quantity can be decreased to 10–15 mg./l. without hydrolysis during the process.

This goal is realized by a modified floatation. In the industry grains with different surface characteristics are separated by means of floatation in such a manner that the slurry is saturated with air-bubbles. Grains with a hydrophilic surface are settling and those with a hydrophobic one are gathering in the foam forming on the surface of the slurry and are removed together with the same.

The invention covers a process for the continuous or intermittent removal of the 30–50 mg./l. suspensions present in the sodium aluminate liquor in such a manner that the sodium aluminate liquor is flown at an overpressure of 1–5 at. and meanwhile gas but preferably air is dissolved in it following which it is let into a closed tank through a pressure releasing device; the upper part of the tank is kept under a vacuum of at least 50 Torr, and the foamy phase being released there and entraining also the suspensions is drained through a vacuum tube, and thus the sodium aluminate liquor having practically been purified from the suspensions is conducted away in the proximity of the liquid level height.

EXAMPLE

Sodium aluminate liquor which exits from the overflow of a settling tank in an alumina plant contains 40 mg./l. suspensions. This liquor is conducted by means of a pump at an overpressure of 3 at. across a Venturitube into the absorbing cyclone chamber; air at an overpressure of 3 at. is pumped into the reducer of the Venturi pipe by means of a pump with counterpaddle whose radius is greater than that of the main paddle. Inside the cyclone chamber the greater part of the air is dissolving in the liquor and that part which remains unsolved is present in the form of rather disperse bubbles. Thereafter the liquor saturated with dissolved air is conducted through several parallely connected pressure releasers — which may also be simple throttle valve — into the lower part of the vacuum tank. From the upper part of the vacuum tank the gas phase together with the foam is drained. As an effect of the vacuum of at least 50 Torr dissolved air separates in form of fine disperse bubbles "in statu nascendi" on the hydrophobic red mud grains in suspension together with which they rise and form a foam on the surface of the liquid.

The foam exits together with the drained air and after that it is precipitated into a separating vessel. Precipitate thus formed containing also red mud grains separated from the sodium aluminate liquor is reconducted into the settling system or removed from the circuit. Now the sodium aluminate liquor having practically been purified from the suspension and the contamination of which drops under 10 mg./l. is lead away from the vacuum tank through an overflow in the proximity of the liquid level height.

The process can be applied for sodium aluminate liquor known in the alumina plant practice as spent liquor which does not contain red mud but aluminium hydroxide particles of 0.5–5 g./l.; furthermore for sodium aluminate liquor known in the alumina plant practice as evaporated thick liquor which, however, contains 2–10 g./l. fine sodium carbonate and other salt grains.

Among the benefits of the process deriving from the invention as compared to processes applied up till now are that; the operation can be made fully continuous, thus the material flow of the connected production phases is not modified quantitatively. It does not require personnel, since the parameters assuring a satisfactory functioning can always be maintained. The output of the system can be varied within wide limits. The equipment serving for the realization of the system is simple and thus investment costs are low. It operates without costly auxiliary materials. Its cleaning grade surpasses that of the presently applied methods. It can be applied for sodium aluminate liquor of any desired concentration. It can be realized with mechanical equipment having no moving parts, consequently maintenance costs are low.

What we claim is:

1. A process for the removal of suspended particles from sodium aluminate liquor, comprising subjecting sodium aluminate liquor containing about 30 to 50 mg/l. of suspended particles to a superatmospheric pressure of 1 to 5 atmospheres gauge, dissolving gas in said liquor under said superatmospheric pressure, then conducting said liquor to a closed tank, maintaining the top of said closed tank at a vacuum of at least 50 Torr thereby to induce the formation of tiny bubbles in said liquor which bubbles rise and float at least some of said particles to the top of the liquid in the tank thereby to form a foamy phase at the top of said tank, withdrawing said foamy phase through a vacuum pipe, and removing liquor depleted in said particles from adjacent the top of the liquid in said tank.

* * * * *